Oct. 17, 1944.   R. P. GARMAN   2,360,488
FISHING REEL
Filed Nov. 26, 1941   2 Sheets-Sheet 1

INVENTOR
ROBERT P. GARMAN
BY
Ely + Frye
ATTORNEYS

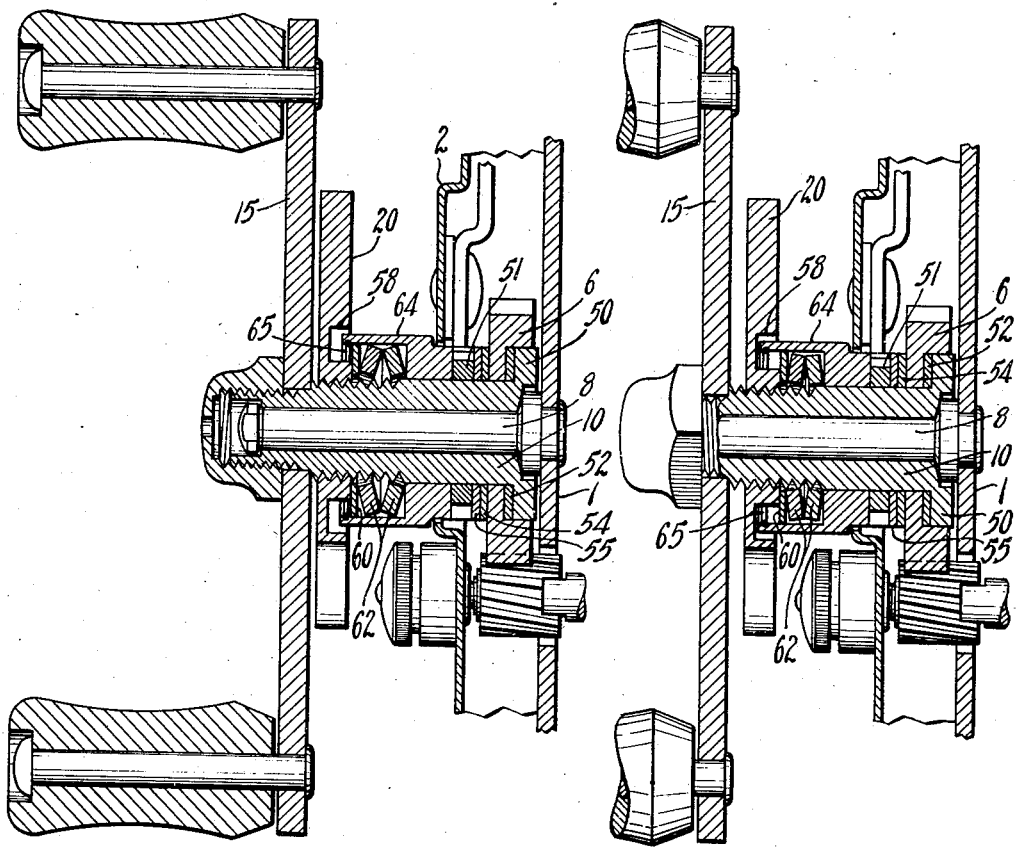

Patented Oct. 17, 1944

2,360,488

UNITED STATES PATENT OFFICE 2,360,488

FISHING REEL

Robert P. Garman, Akron, Ohio, assignor to The Enterprise Manufacturing Company, Akron, Ohio, a corporation of Ohio Application November 26, 1941, Serial No. 420,456

10 Claims. (Cl. 64—30)

The present invention relates to fishing reels and particularly to reels of the type in which there is provided a drag mechanism usually known as a "handle drag" because it is associated with the crank handle. This type of construction is generally employed in salt water reels which are used for large salt water fish, and the invention herein described and claimed is for an improvement in this drag mechanism.

The purpose of the drag mechanism is to provide adjustable friction between the crank and the shaft or driving sleeve to which it is connected and the gear which is in mesh with the spool driving pinion. With the device is usually associated a ratchet mechanism which prevents the crank from operating in the direction to pay out the line, the rotation of the spool in that direction being retarded by the friction exerted against the gear by the adjustable drag mechanism.

The objection to present standard forms of drag mechanism is that they are universally uneven and irregular in operation, there being a tendency in even the most highly developed prior drag mechanisms to grabbing or jerky or uneven release. In the mechanism as shown and described herein, there is a new and improved combination of parts or elements which insures a smooth and even operation at all degrees of frictional resistance. The frictional drag is exerted through spring pressure elements which exert an evenly distributed load over the frictional surface and by reason of the fact that at adjustment for even the maximum drag, there is a certain yielding pressure evenly distributed throughout the drag mechanism. The operation is always uniform, smooth and even and there is no tendency to a jerky or spasmodic release as is true of all other types of drag mechanism. The effect of this form of drag mechanism is to give a smooth, even adjustable drag without any tendency to "grab" and one which will operate in this manner for all adjustments, even to the maximum, and as it retains sufficient spring in the parts to avoid harsh action even at the maximum adjustment.

It is also an object of the invention to provide for an auxiliary support for the shaft, which is especially advantageous in the larger types of salt water reels where the excessive strains tend to bend or break the post upon which the shaft rotates.

The new and improved drag device is adaptable to any type of reel and for this reason only the drag mechanism is shown and described. The balance of the reel may be of any well known form.

It will be understood that while the description and drawing are quite specific to the two best known or preferred forms of the invention, changes and modifications may be made therein or parts thereof may be varied.

In the drawings:

Fig. 4 is a view of a modified and less highly developed form of the invention at its relaxed position.

Fig. 5 is the device of Fig. 4 in its maximum adjusted position.

Figure 1:
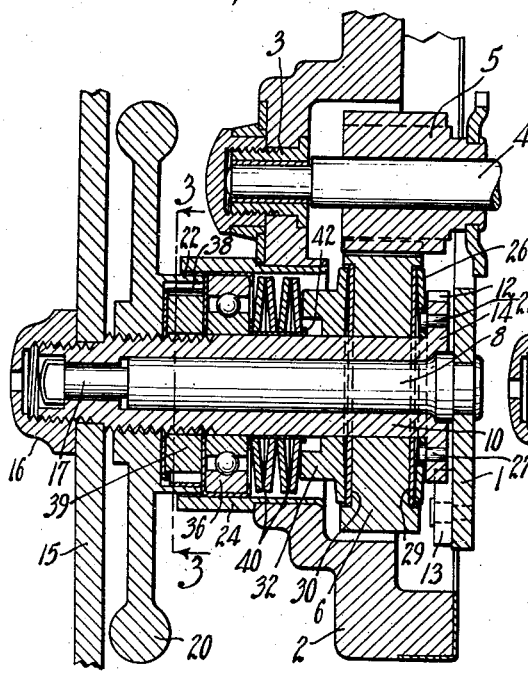
Fig. 1 is a cross-section through the drag handle in one form of the invention, showing the parts in a relaxed or light frictional relationship. This embodiment of the invention is designed for heavy reels in which the load exerted may be very great.
Figure 2:
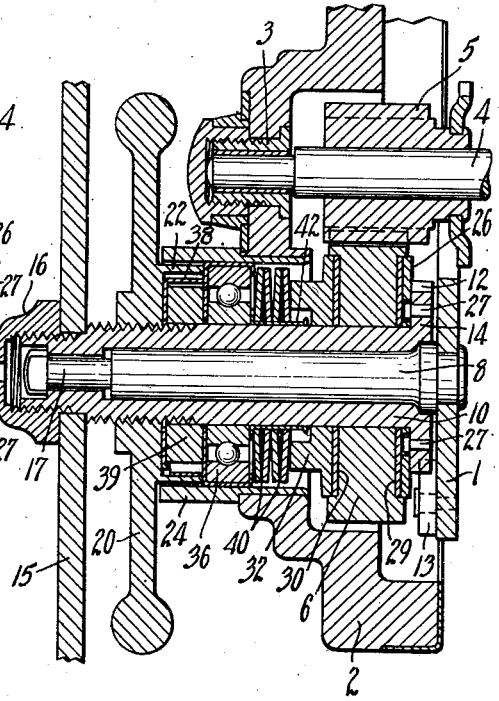
Fig. 2 is a similar cross-section showing the drag mechanism in its maximum frictional adjustment.

In Figs. 1 and 2, the numeral 1 is applied to the bridge of the reel, the balance of the reel frame not being shown as it may be of any standard type; 2 is the gear casing or cap having therein the thrust bearing 3 in which the spool shaft 4 is journaled. On the shaft 4 is located the spool driving pinion 5 which is usually provided with a shifting lever for free spool operation. The pinion 5 meshes with the main driving gear 6.

Rising from the bridge 1 is the fixed post 8 on which is rotatably mounted the hollow shaft or driving sleeve 10 on which the gear 6 is rotatable, the driving connection between the sleeve 10 and gear 6 being through the drag mechanism to be described. The inner end of the shaft 10 is provided with the ratchet 12 formed on the outer edge of a flange 14 and engageable by the pawl 13, so that reverse movement of the shaft is prevented. The outer end of the shaft or sleeve 10 is provided with flat surfaces on which the operating crank 15 is located, being held in position by the cap screw 16. A screw threaded bolt 17 engaging in the post 8 holds the driving sleeve in position.

The outer end of the driving sleeve is screw threaded and on this portion of the sleeve is threaded the adjusting device, usually in the form of a star-wheel 20, the inner side of which is provided with a flange 22 which bears upon the friction devices to the extent to which the star-wheel is moved downwardly on the sleeve. Surrounding the mechanism is a tubular casing 24.

Surrounding the driving sleeve and lying between the flange 14 and the gear 6 is a metal disk 26, usually formed of brass or some other spring metal, and held from rotation relative to the sleeve by the pins 27. It will be observed that this disk is concave or cupped so that in normal or uncompressed condition it assumes the shape shown in Fig. 1. However, when pressure is applied the disk will flatten and exert pressure upon the intermediate pressure plate or disk 29 which is seated in a recess in the inner side of the gear 6.

On the opposite side of the gear 6 and lying in a similar recess is a second friction disk 30, on top of which lies the pressure plate or disk 32, preferably made of the same material as the disk 26. The disk 32 is also concave or cupped, as shown in Fig. 1, so that in relaxed position it lies substantially as shown, but will flatten out, as shown in Fig. 2, under load.

It will be noted that the outer side of the plate 32 is recessed to provide room for the spring disk retainer when the unit is under compression, as will be described.

Figure 3:
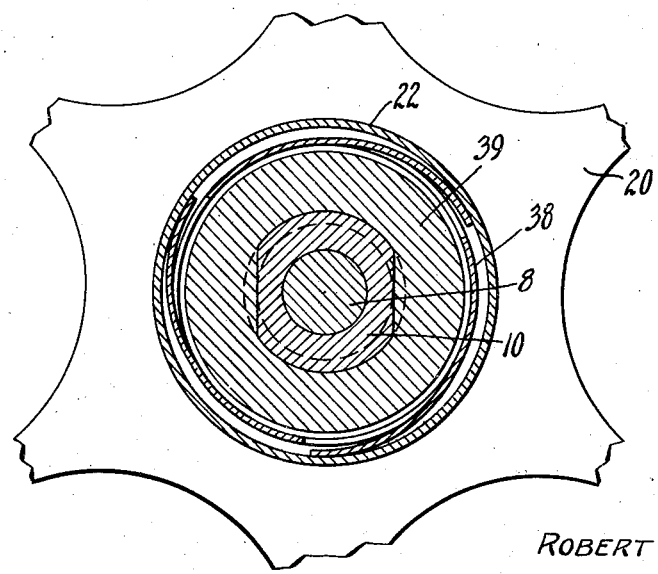
Fig. 3 is a cross-section on the line 3—3 of Fig. 1.

Pressure on the friction members is transmitted from the star-wheel 20 and its flange 22 to the interposed frictionless or ball bearing ring member 36. In order to exert a certain retarding action on the star-wheel so that it will not drift from its adjusted position, there is located in the recess provided by the flange 22 a spring retainer consisting of a spring metal cup 38 (Fig. 3), the rim of which is formed with spring fingers which are pressed outwardly to bear against the inner surface of the flange 22. A filler piece 39 is located within the cup 38.

Between ball bearing ring 36 and the outer surface of the disk 32 are located a plurality of ring-shaped spring metal disks, here shown as four in number. These disks are formed of relatively heavy spring metal and are cupped or concaved so that in normal or uncompressed condition they assume the position shown in Fig. 1. It is preferred to arrange those disks which are numbered 40 in pairs, each disk of a pair being oppositely positioned with respect to its mating disk and with the rims of the disks of each pair in contact. In order to hold this pile of disks together when the device is taken apart for cleaning and oiling, a ring-like retainer 42 is provided which fits in the apertures of the several disks and is bent on opposite sides thereof, as shown in Fig. 1, so as to hold the several disks together. When the drag mechanism is compressed, this retainer will be received in the recess in the face of the plate 32.

As the pressure is applied through the manipulation of the star-wheel 20, these disks will flatten and the spring pressure transmitted thereby to the disks 32 and 26 will be evenly and uniformly distributed about the entire periphery of the disks and thus evenly distributed to the friction members, and there is no possibility of any localization of the pressure. As a result, the rotation of the gear 6 about the driving sleeve 10 will also be smooth and free of jerkiness, a feature which is extremely valuable, especially in reels of this type where jerking of the line will create strains which may break the line, or in which momentary relaxation of the line may cause loss of the fish. Any jerkiness in the operation of the drag will be transmitted to the crank and is extremely disadvantageous when reeling in the line.

In order to insure this smoothness of operation even when the drag is set at its maximum, the arrangement is such that the disks 40 will never be entirely flattened but will always be arched or bowed slightly and thus retain some degree of spring. This is assured by forming the washers from a metal stock of the requisite temper and thickness so that they will not completely flatten under any pressure which can be exerted by hand adjustment of the star-wheel.

The smoothness of operation is also assured by reason of the cupping of the plates 32 and 26, but it will be observed that these will flatten out under compression before the disks 40. As a result, the pressure transmitted to the disks 32 and 26 will be applied over the entire surface of the friction members.

It is possible to place the disks 40 in reverse, that is, with the centers of the disks of a pair in contact, instead of the rim contact, but this is not preferred. In the preferred arrangement the pressure is applied to the rims rather than at the hubs of the disks 40 and more even pressure is thus applied.

One of the principal advantages of the drag mechanism shown herein is that in both forms of the invention the friction disks which contact the gear 6 may be made of Bakelite, or some like material, either with or without a fibrous content. With previous drag mechanisms smoothness of operation has been improved by the use of leather disks which are sufficiently compressible to compensate, in a measure, for uneven pressure applied through the mechanical parts of the drag. With the improved type of drag, however, and with the maintenance of spring pressure at all times, even at the maximum, the composition friction disks operate more smoothly than leather disks. Leather disks may also acquire a permanent distortion and deteriorate rapidly from water or oil, an objection which is not present with the Bakelite or composition friction disks.

It will also be observed that while the pressure is always a spring pressure, the combined pressure exerted by the six spring members, i. e., the disks 26, 32 and 40, is sufficient to exert all of the resistance necessary to retard the rotation of the gear 6 about the driving sleeve.

It is also possible to secure a fairly effective drag without cupping either or both of the disks 26 and 32, the spring washers or disks 40 maintaining adequate yielding pressure, but the maximum benefits of the invention are secured by the use of the full spring action of all of the parts as described.

In reels of this type, particularly large reels, the lateral strains to which the shaft is subjected, due to the weight, size and fighting ability of large game fish, often cause failure because there is no support for the shaft except at its base and consequently the post 8 will frequently break or loosen at the point of its attachment to the bridge 1. The bearing 36 in the present form has an additional function because it also serves to support the post 8 at a point along the housing 24, so that the strains exerted upon the shaft are also borne by the part 24. It will be noted that the ball bearing 36 is set with its sections coaxial with the shaft so as to act as a frictionless bearing opposed to the side thrusts of the shaft 10.

In the form of the invention disclosed in Figs. 4 and 5, a simpler construction is shown which is suitable for lighter reels where the friction drag to be exerted is not so great as in the other and larger form. In those views, so far as possible, like reference numerals are applied to similar parts.

In this form, the front plate 1 supports the post 8 on which the driving sleeve 10 is mounted. The sleeve 10 is provided with the enlarged base flange 50 and the ratchet 51 is keyed to the sleeve on the upper side of the gear. Between the flange 50 and the gear 6 is located one friction disk 52, the second friction disk 54 being on the opposite side of the gear and separated from the ratchet by a washer 55.

The crank 15 is mounted on the end of the driving sleeve and the star-wheel 20 is threaded on the sleeve below the crank. In this case the under side of the star-wheel is provided with the groove 58.

The pressure of the star-wheel is transmitted to the friction members through a disk 60 which rests upon the top of the upper member of a pair of cupped spring metal disks or washers 62 which are arranged similarly to the washers 40 in the other form of the invention. These washers are located in a housing 64 which is recessed to receive them and which bears at its inner end against the ratchet 51. A split spring lock ring 65, seated in a groove in the housing, holds the parts 60 and 62 in position when the device is disassembled.

In this embodiment of the invention, the spring pressure disks 62 are arched so as to exert the spring pressure upon the friction members when the maximum adjustment is secured and, as with the disks 40, are so designed and proportioned as to retain their cupped formation even against the maximum pressure which may be exerted by manual adjustment of the star-wheel.

It will be seen that a characteristic feature of the invention in either form lies in the fact that the pressure is transmitted from the adjusting means, or star-wheel, through the arched cup-like spring metal washers, and the design is such that the spring pressure is present at even the greatest point of adjustment. This assures the smooth operation of the drag, which has not been found in other forms of drag mechanism. By the mechanism shown, the operation is better than can be obtained with the older forms of drag mechanism in which leather disks were employed and, in addition, the disadvantages of using leather for this purpose are eliminated.

What is claimed is:

1. In a drag mechanism for fishing reels, a shaft, a spool driving gear rotatably mounted on the shaft, friction members on opposite sides of the gear, and means to apply adjustable pressure upon the friction members, said means comprising a manually adjustable pressure device movable on the shaft, and spring metal washers between the adjusting means and the friction members, said washers being cupped and placed in reverse position and so designed and proportioned as to arrest the movement of said adjustable pressure device, when manually operated, before said washers are flattened.

2. In a drag mechanism for fishing reels, a shaft, a spool driving gear rotatably mounted on the shaft, friction means in contact with the gear, and means to exert pressure on said friction means comprising a manually adjustable pressure device movable on the shaft, and a cupped spring metal washer between the pressure device and the gear and so proportioned and designed as to arrest the inward movement of the pressure device, when manually operated, while the washer is in cupped condition.

3. In a drag mechanism for fishing reels, a shaft, a spool driving gear rotatably mounted on the shaft, friction disks in contact with the gear, a manually operated pressure device threaded on the shaft, and a plurality of normally concave spring disks between the pressure device and the gear, said disks being so designed and proportioned as to arrest the inward movement of the pressure device, when manually operated, before all of said disks are flattened.

4. In a drag mechanism for fishing reels, a shaft, a spool driving gear rotatably mounted on the shaft, a manually adjustable pressure device threaded on the shaft, friction means in contact with the gear, and a plurality of concave spring metal disks between the pressure device and the gear, said disks being placed in opposing relationship and in rim-to-rim contact and so designed and proportioned as to arrest movement of said adjustable pressure device, when manually operated, before said disks are flattened.

5. In a drag mechanism for fishing reels, a shaft, a spool driving gear rotatably mounted on the shaft, an adjustable pressure device threaded on the shaft, friction means in contact with the gear, a plurality of concave spring metal disks between the pressure device and the gear, said disks being placed in opposing relationship, and means to retain said disks in assembled relationship when removed from the reel.

6. In a drag mechanism for fishing reels, a shaft, a spool driving gear rotatably mounted on the shaft, an adjustable pressure device threaded on the shaft, friction means in contact with the gear, a plurality of spring metal disks between the pressure device and the gear, and means to retain said disks in assembled relationship when removed from the reel.

7. In a drag mechanism for fishing reels, a shaft, a spool driving gear rotatably mounted on the shaft, an adjustable pressure device on the shaft, friction disks in contact with the sides of the gear, pairs of concave spring metal disks between the pressure device and the gear, the disks of each pair being placed in reverse position, and means to maintain the disks in assembled position when removed from the reel.

8. In a drag mechanism for fishing reels, a shaft, a spool driving gear rotatably mounted on the shaft, an adjustable pressure device on the shaft, friction disks in contact with the sides of the gear, concave spring metal pressure plates on opposite sides of the gear, pairs of concave spring metal disks between the pressure device and the gear, the disks of each pair being placed in reverse position, and means to maintain the disks in assembled position when removed from the reel.

9. In a drag mechanism, a shaft, a spool driving gear rotatable about the shaft, and friction means to drive said gear from the shaft including a yielding spring pressure member and manually operated means to compress the spring pressure member to varying degrees, said pressure member having sufficient resistance to the manual operation of the compressing means to arrest the operation of the last named means before the pressure member is wholly compressed.

10. In a drag mechanism, a shaft, a spool driving gear rotatable about the shaft, and friction means to drive said gear from the shaft including a plurality of spring pressure members and manually operated means to compress said spring pressure members to varying degrees, said pressure members having sufficient resistance to the manual operation of the compressing means to arrest the operation of the last named means before all of said pressure members are wholly compressed.

ROBERT P. GARMAN.